United States Patent [19]

Sherman et al.

[11] Patent Number: 4,577,102

[45] Date of Patent: Mar. 18, 1986

[54] METHOD AND APPARATUS FOR DISTINGUISHING HYDROCARBON FROM FRESH WATER IN SITU

[75] Inventors: Harold Sherman, Ridgefield; John J. Ullo, Bethel, both of Conn.

[73] Assignee: Schlumberger Technology Corporation, New York, N.Y.

[21] Appl. No.: 328,881

[22] Filed: Dec. 9, 1981

[51] Int. Cl.$^4$ ............................................. G01V 5/10
[52] U.S. Cl. ..................................... 250/269; 250/256
[58] Field of Search ....................... 250/269, 256, 270; 73/152

[56] References Cited

U.S. PATENT DOCUMENTS

| | | | |
|---|---|---|---|
| Re. 28,477 | 7/1975 | Nelligan | 250/262 |
| Re. 28,925 | 8/1976 | Jorden et al. | 73/152 |
| 3,231,041 | 1/1966 | Kokesh | 367/25 |
| 3,240,938 | 3/1966 | Hall | 376/165 |
| 3,247,377 | 4/1966 | Hall | 376/165 |
| 3,435,217 | 3/1969 | Givens | 250/265 |
| 3,453,433 | 7/1969 | Alger et al. | 250/265 |
| 3,483,376 | 12/1969 | Locke et al. | 250/392 |
| 3,490,279 | 1/1970 | Alger | 73/152 |
| 3,500,683 | 3/1970 | Hoyle | 73/152 |
| 3,508,439 | 4/1970 | Alger | 73/152 |
| 3,521,065 | 7/1970 | Locke | 250/264 |
| 3,532,884 | 10/1970 | Dewan | 250/264 |
| 3,566,117 | 2/1971 | Tixier | 250/264 |
| 3,566,682 | 3/1971 | Winkler, Jr. | 73/152 |
| 3,590,228 | 6/1971 | Burke | 364/422 |
| 3,608,373 | 9/1971 | Youmans | 73/152 |
| 3,638,484 | 2/1972 | Tixier | 73/152 |
| 3,691,378 | 9/1972 | Hopkinson et al. | 250/264 |
| 3,721,960 | 3/1973 | Tinch et al. | 73/152 |
| 3,775,216 | 11/1973 | Frentrop | 156/293 |
| 3,823,319 | 7/1974 | Tittman | 250/265 |
| 3,829,687 | 8/1974 | Caldwell | 376/166 |
| 3,887,805 | 6/1975 | Schuster | 250/264 |
| 3,947,683 | 3/1976 | Schultz et al. | 250/270 |
| 4,005,290 | 1/1977 | Allen | 250/266 |
| 4,035,639 | 7/1977 | Boutemy et al. | 250/264 |
| 4,047,027 | 9/1977 | Bateman et al. | 250/264 |
| 4,048,495 | 9/1977 | Ellis | 250/264 |
| 4,055,763 | 10/1977 | Antkiw | 250/270 |
| 4,095,102 | 6/1978 | Tixier | 250/265 |
| 4,286,150 | 8/1981 | Allen | 250/270 |
| 4,379,228 | 4/1983 | Allen | 250/266 |
| 4,399,359 | 8/1983 | Fertl et al. | 250/270 |
| 4,416,151 | 11/1983 | Ullo | 73/152 |

OTHER PUBLICATIONS

F. Lebreton, A. H. Youmans, H. I. Oshry, B. F. Wilson, "Formation Evaluation with Nuclear and Acoustic Logs," *Fourth Annual Logging Symposium Transactions*, May 23-24, 1963, pp. IX-1/IX-19.

*Primary Examiner*—Janice A. Howell
*Assistant Examiner*—Constantine Hannaher
*Attorney, Agent, or Firm*—Stephen L. Borst; David G. Coker; David P. Gordon

[57] ABSTRACT

Method and apparatus for distinguishing oil from fresh water in situ in a subsurface geological formation are proposed which utilize the anomalous response of a neutron porosity tool to some oils. Apparent porosity derived from a neutron porosity investigation tool which measures spatial neutron flux distribution is compared to the porosity derived from a second investigating tool whose response is not or at least is less sensitive to the hydrogen density of the formation fluid than is the neutron porosity tool. Where a real difference is evident, oil rather than fresh water is indicated.

30 Claims, 4 Drawing Figures

METHOD AND APPARATUS FOR DISTINGUISHING HYDROCARBON FROM FRESH WATER IN SITU

The subject matter of this invention is related to subject matter disclosed in U.S. patent application Ser. No. 328,880 of John J. Ullo, filed of even date herewith and assigned to the same assignee of the present invention.

FIELD OF THE INVENTION

The present invention relates generally to the field of the investigation of characteristic properties of subsurface geological formations penetrated by a borehole by means of an instrument or instruments passed therethrough. More specifically, the present invention relates to the determination of the identity of the fluid in the formation: whether it be a hydrocarbon or water. More specifically still, the present invention relates to a neutron based technique and apparatus useful for distinguishing between some oils and water.

BACKGROUND OF THE INVENTION

It should go without saying that it is highly desirable to be able to distinguish between oil and water in a geological formation penetrated by a borehole. The ability to do so enables one to determine, among other things, if a porous formation contains oil or water, the rate of movement and position of the oil/water interface during well production, and whether the water driving fluid has broken through to the production well in a water flood secondary production operation. It has been conventional in the past to distinguish between oil and water by means of a resistivity tool which reads a low resistivity when the formation is saturated with saline water, a good conductor; and a high resistivity when the formation is saturated with oil, an insulator.

It has also been conventional in the past to distinguish between oil and water by taking advantage of the differences in the macroscopic neutron absorption cross section of oil and the normally saline formation water. Since the saline formation water contains chlorine which has a rather high neutron capture cross section and since oil does not, neutron tools have been developed which essentially measure the macroscopic neutron capture cross section (Sigma).

For example, U.S. Pat. No. 3,566,116 (reissued July 8, 1975 as U.S. Pat. No. Re. 28,477); U.S. Pat. Nos. 3,691,378; and 4,055,763 illustrate variations of one such technique for determining Sigma in which a pulsed neutron source is utilized to irradiate the formation with a repetitive burst of fast neutrons in order to permit a time evaluation of the neutron population in the resultant neutron cloud. Typically, this evaluation is accomplished by detecting capture gamma rays which result when thermalized neutrons of the cloud are captured or absorbed by a nucleus of a constituent element in the formation. In such a time evaluation, advantage is taken of the fact that the neutron cloud density decays exponentially, with the characteristic decay time being a function of the macroscopic neutron absorption cross section of the formation. The macroscopic neutron absorption cross section is the sum of the neutron absorption of the elemental constituents of the formation and of its contained fluids.

While these neutron tools and techniques are quite effective in distinguishing between oil and water under normal circumstances, a number of limitations have been encountered. One such limitation is the situation in which, for one reason or another, the non-oil fluid in the formation is fresh water rather than saline water. In this circumstance it is not possible using the above described pulsed neutron technique to distinguish between oil and water since the differences between the neutron capture cross section of the two formation fluids (oil and fresh water) is not large enough to permit their differentiation.

A further limitation that the pulsed neutron techniques for determining Sigma have encountered is their inability to properly determine Sigma in a formation containing large amounts of naturally radioactive elements such as thorium, uranium and potassium. Accumulations of one or more of these radioactive elements may produce a gamma-ray background that obscures the desired information relative to the neutron cloud established by the pulsed neutron source. Unfortunately, accumulations of naturally occurring radioactive elements are often encountered in a producing well. When these radioactive elements are found dissolved in the formation fluids, they may precipitate out of solution and accumulate at the well casing perforations through which the formation fluids are flowed. This creates a radioactive deposit that produces a relatively high gamma-ray background which interferes with the detection method of the pulsed neutron technique. Thus, information regarding Sigma and oil/water movements in the very formation zones of greatest interest may be unavailable due to this obscuring background.

An additional limitation with the pulsed neutron technique is encountered in wells that have fresh water in the well borehole, even though saline water is present in the formation. In such a circumstance, some neutrons from the neutron burst are thermalized and linger in the fresh water of the borehole, giving rise to an interfering "diffusion" background. This effect of course does not occur in those boreholes having saline water since the chlorine is a strong neutron absorber which rapidly scavenges the diffusion neutrons. The "diffusion" background is a particularly bothersome phenomenon for the pulsed neutron technique since the determination of the characteristic decay time following the neutron burst relies on the detection of neutron fluxes whose intensities decrease with time to relatively small values. As a result, the "diffusion" background becomes large relative to the neutron flux of interest so as to obscure the information bearing signal.

In view of the difficulties and limitations inherent in the pulsed neutron technique, one naturally seeks other neutron instruments and techniques that might be suitable for distinguishing between oil and water in those very circumstances there the pulsed technique is lacking. The other conventional neutron instrument used in logging oil wells is commonly referred to as the neutron-neutron tool since it contains a continuous neutron source for irradiating the formation and neutron detectors for detecting the spatial distribution of neutrons established by the source. It is conventional to utilize this tool to measure porosity of the formation under investigation. U.S. Pat. No. 3,483,376, issued Dec. 9, 1969, entitled "TWO NEUTRON DETECTOR EARTH FORMATION POROSITY LOGGING TECHNIQUE", commonly assigned to the assignee of the present invehtion, describes in detail an illustrative embodiment of such a neutron-neutron tool.

Interestingly, in the past, very little has been understood about which parameters of a medium influence porosity response in an investigating instrument. This is indeed the case for neutron-neutron or neutron-gamma porosity tools. Such neutron tools utilize a source for emitting neutrons into the adjacent formations and subsequently or simultaneously detect the spatial distribution of the resultant neutron cloud through either the direct detection of neutrons or through the detection of gamma rays which are created when a neutron is absorbed in the nucleus of an atom of the formation.

Following emission from the source, the neutrons travel through the formation and lose energy by collision with the nuclei of the atoms of the formation. When the energy level of the neutrons is reduced or moderated sufficiently, they may be detected and counted by the investigating instrument. Generally, it is assumed, that primarily the hydrogen index (i.e., the number of hydrogen atoms per unit volume of the formation fluid) is responsible for the spatial distribution of the cloud of neutrons. Since hydrogen is the only element whose nuclear mass resembles that of the neutron, hydrogen is the most effective element in reducing the energy level of the neutrons to a level at which they are eventually detected. In general, the formation pore spaces are filled with either water or liquid hydrocarbons which both contain hydrogen. Thus, this type of neutron log is essentially a record of the hydrogen atom density of the rocks surrounding the borehole. Previously, the neutron log has been considered, therefore, to be a measure of the formation porosity. It is well recognized that gas, on the other hand, will alter this porosity determination since the gas is much less dense than its oil liquid counterpart.

U.S. Pat. No. 4,095,102 issued on June 13, 1978 to Tixier and assigned to the Assignee of the present patent, compares a value of porosity derived from an epithermal neutron-neutron (gamma) tool with a value of porosity derived directly from a measurement of the thermal neutron absorption characteristic of the formation and value of the water component of the formation. Where a difference is noted, hydrocarbon may be expected. In a manner similar to those techniques described earlier that utilize pulses of neutrons to determine a characteristic decay time dependent on macroscopic neutron capture cross section and hence a porosity, the disclosed technique requires saline water in the formation.

SUMMARY OF THE INVENTION

It has not been heretofore thought possible to distinguish formation oil from formation water by a neutron technique unless the water contains neutron absorbers (such as chlorine) which are absent in the formation oil. The conventional wisdom in the field of oil exploration has been that oil and fresh water "look alike" when examined by neutron moderation type as opposed to neutron absorption type investigating tools. Indeed, fresh water and oils which typically are used in laboratory test formations and many oils and waters in earth formations do "look" indistinguishable. This common assumption is expressed in U.S. Pat. No. 3,721,960 which states "thus, it can be said that this type of neutron log is essentially a record of the hydrogen atom density of the rocks surrounding the borehole. Since the formation pore spaces are generally filled by either water or liquid hydrocarbons which have about the same amount of hydrogen, the neutron log does not distinguish between oil and water . . ."

However, recent investigations of atypical oils used in laboratory experiments have led to the startling and previously unsuspected discovery that many world crude oils, especially those loosely categorized as "heavy crudes", have properties sufficiently different from fresh water to permit a logging technique that could be used successfully to distinguish between oil and fresh formation water.

Specifically, it has been discovered that neutron transport through many crude oils is sufficiently different from neutron transport through fresh water so as to be detectable. It is hypothesized that the observed neutron transport differences are attributable to the influence on neutron transport exerted by the number of hydrogen nuclei present in the medium of transport. Thus, it is herein proposed that media with high hydrogen densities cause the creation of detectably different neutron fluxes than those media with lower hydrogen densities.

It has been assumed in the past that both water and oil have about the same amount of hydrogen, or in other words, have approximately the same hydrogen index or hydrogen density. Accordingly, prior neutron moderation type tools were believed to be incapable of distinguishing between oil and water. Recent experimental investigations and their close evaluation has led to the conclusion that oil and water do not necessarily have the same hydrogen densities. In fact, it has been discovered that the differences between the hydrogen densities of water and some oil, albeit small, may be large enough to have a measurable effect on the porosity response of the neutron investigating instrument. It has also been discovered that additional differences between oil and water, such as the presence of carbon in oil and its absence in water, and the presence of oxygen in water and its absence in oil, may produce an additional effect on porosity response which might further assist in the ability of a neutron tool to distinguish between oil and water.

It has been found that these differences between some oils and water tend to cause the apparent porosity registered by a neutron tool in a crude-oil saturated formation to be higher than true volumetric porosity when a tool calibration based on fresh water filled porosity is used. With this realization, it is proposed to take advantage of the effect to identify the presence of oil by using a combination neutron porosity logging tool with another porosity logging tool to look for clean formations (as determined, for example, by the natural gamma-ray log) where the porosity indicated by the neutron tool exceeds that derived from the other porosity tool. Alternatively, one might first log a known oil bearing formation with a neutron porosity logging tool, produce the formation oil with steam flood or water flood, re-log the formation with the neutron porosity logging tool and compare the pre- and post-logs to determine information about the production of the formation.

It is therefore proposed that the oil/water content of the fluid within a geological formation may be investigated, broadly speaking, by irradiating the formation with neutrons, and by measuring a property indicative of neutron transport through the matrix and the fluid comprising the formation to derive an indication which represents the influence of the formation fluids on neutron transport and which is substantially devoid of the influence of the matrix on neutron transport. This information may then be used to determine a characteristic of the fluid in the formation.

More specifically, the neutron flux distribution resulting from the irradiation is measured and used to derive a first signal which is a function of both formation porosity and hydrogen density of the fluid in the formation. The presence of oil versus water in the formation is then determined by deriving from the same geological formation a second porosity signal that is either less affected by the nature of the formation fluid, whether water or oil, than the first signal, such as is available from a gamma-gamma density tool or a sonic tool or that is obtained following the change of the formation fluid to a fluid having, say, a different hydrogen density, and combining the signals to determine their differential. Where the first porosity signal exceeds the second porosity signal, oil as opposed to water may be suspected. The step of detecting the neutron flux distribution may include detecting the spatial neutron flux distribution by detecting neutron flux amplitudes at one or more points spaced from the neutron source. In addition, the neutron detection step may comprise the detection of the epithermal neutron flux distribution.

In a variation of the invention, the formation is irradiated in two steps with neutrons having different average energy levels in order to measure the spatial neutron flux distribution resulting from each. Comparison of the resultant signals yields an indication of the presence of oil or of water. One of the average energy levels is chosen such that the total cross section mismatch between oil and water is small, while the other is chosen such that the total cross section mismatch between oil and water is large relative to that of the other.

BRIEF DESCRIPTION OF THE DRAWINGS

The present invention may be better understood and its numerous objects and advantages will become apparent to those skilled in the art by reference to the accompanying drawings which generally illustrate the concepts of the present invention in which.

DESCRIPTION OF THE BEST MODE OF THE INVENTION

Figure 1:
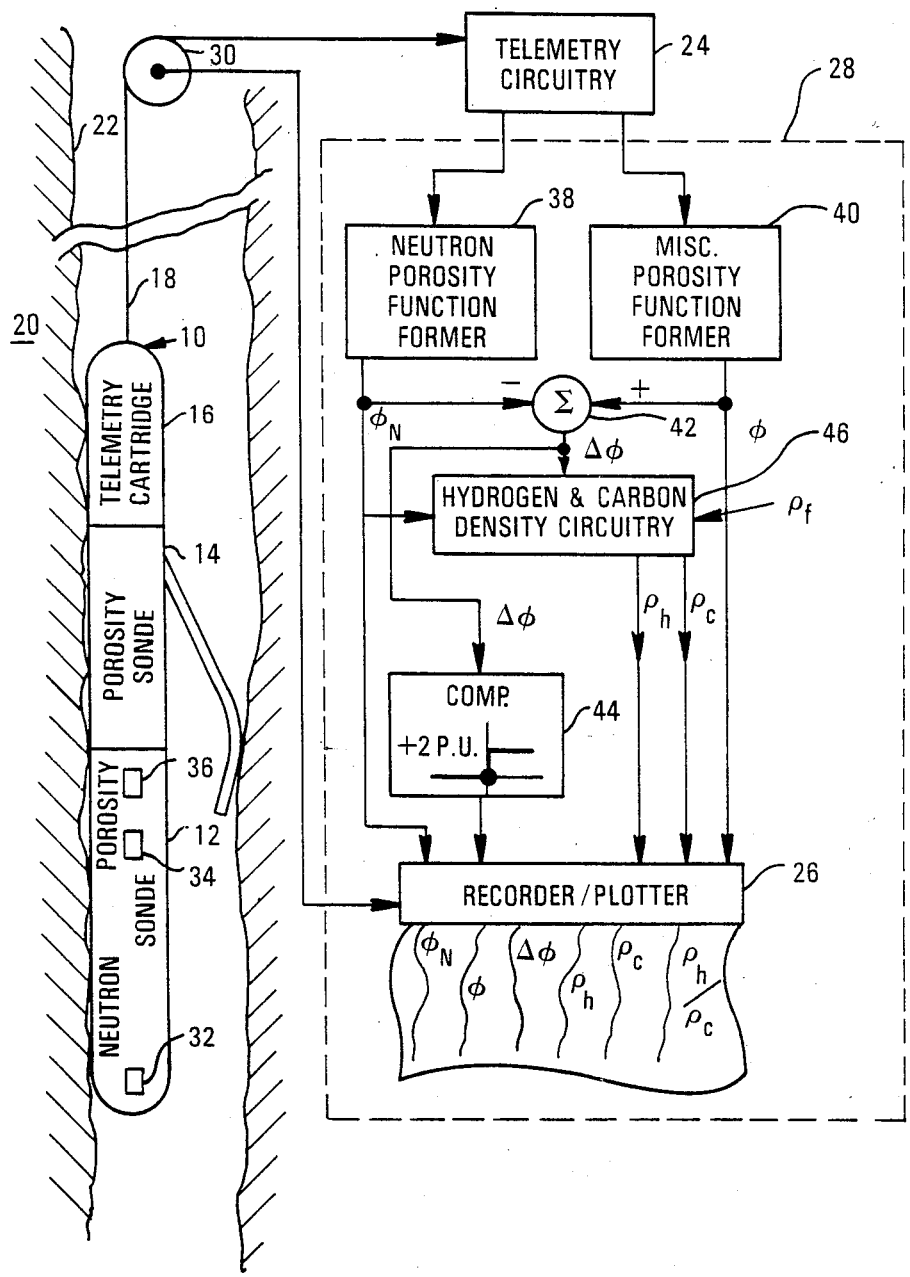
FIG. 1 schematically illustrates an embodiment of the invention in which a neutron porosity log derived from a neutron logging tool is combined with a porosity derived from a different logging tool to yield an indication of oil versus water.

While the invention is susceptible of various modifications and alternative constructions, there is shown in the drawing and there will hereinafter be described, in detail, a description of the preferred or best known mode of the invention. It is to be understood, however, that the specific description and drawing are not intended to limit the invention to the specific form disclosed. On the contrary, it is intended that the scope of this patent include all modifications and alternative constructions thereof falling within the spirit and scope of the invention as expressed in the appended claims, to the full range of their equivalents.

An illustrative embodiment of a practical apparatus embodying the principles of the invention is shown in FIG. 1. A borehole logging tool string 10 is shown consisting of a pair of tools 12 and 14 suspended by an armored cable 18 in a borehole 22 formed in a geological formation 20. Cable 18 comprises insulated conductors that electrically connect the logging equipment via a down-hole digital telemetry cartridge 16 with an up-hole telemetry system 24 and a data processing system 28 at the earth's surface. The data processing system 28 may comprise a digital apparatus such as a PDP-11/34 computer made by the Digital Equipment Corp. and specially modified, as by stored instructions, to carry out the present invention. A winch (not shown) is located at the surface and is used to lower and raise the tool string 10 in the borehole 22 to traverse earth formations 20 by amounts detected by a depth monitoring apparatus 30. Signals indicative of tool depth in the borehole are delivered from the depth monitoring system 30 to the system 28.

The tool string includes a neutron porosity logging tool 12 and a porosity logging tool 14 of a different type. The sonde portion of the neutron porosity tool contains a neutron source 32, having a yield of typically $4 \times 10^7$ neutrons per second. Usually, the source 32 is a "chemical" neutron source, for example, a mixture of plutonium and beryllium or americium and beryllium. Alternatively, neutron source 32 may comprise a neutron generator of the ion accelerator type, an example of which may be found described in U.S. Pat. No. 3,775,216 assigned to the assignee of the present invention. Each of these neutron sources is isotropic and emits neutrons with equal probability in all directions.

The neutrons emitted from source 32 diffuse through the formations 20 and are detected by a neutron detection system which may consist of either a single detector system or a dual detector system which is preferred. In the dual detector system, neutrons are registered by a near-spaced neutron detector 34 and a far-spaced detector 36: each of which generate a signal indicative of neutron flux distribution which in turn is related to the neutron transport properties of the neutrons through both formation matrix and formation fluid. Typically, these detectors each comprise a hollow cylindrical cathode filled with a neutron sensitive gas, $He^3$ or boron-trifluoride, for example. An anode wire (not shown) in the center of the cylinder creates a voltage gradient through the gas-filled cylinder that enables ionized nuclear particles, produced as a consequence of neutron absorption within the gas nuclei, to establish charged pulses in the detector electrodes. The far-spaced detector 36 has a much larger volume than the near-spaced detector 34 and is typically filled with the $He^3$ gas at a higher pressure so as to enhance its sensitivity to neutrons. A neutron shield (not shown) is typically positioned between the near detector 34 and the source 32 in order to reduce the direct irradiation of the near detector by neutrons from the source and in order to increase the porosity sensitivity of the tool.

Near and far detectors 34 and 36 preferably may be designed to detect epithermal neutron populations as opposed to thermal neutron populations. In such a case, the epithermal neutron detectors are similar to the thermal neutron detectors but include a cadmium or other neutron absorbing sleeve which preferentially absorbs neutrons having energies below an energy threshold characteristic of the shielding material. In addition, due to the decreased counting rates when detecting epithermal neutrons, detectors 34 and 36 may be located at optimal distances closer to the source than would be the case for thermal neutron detectors and may be pressurized to a greater degree than thermal neutron detectors.

Pulses from detectors 34 and 36 are accumulated in appropriate circuitry (not shown) in order to generate count rate signals proportional to the neutrons detected per second by each of the individual detectors. These signals are indicative of the spatial neutron flux distribution at the particular source-detector spacing. Alternatively, detectors 34 and 36 and the associated electronic circuitry may generate signals indicative of the total energy deposited in the respective detectors, which is functionally related to the count rate. For purposes of convenience, the signals generated by detectors 34, 36 will hereafter be referred to in terms of count rates but it will be recognized that the invention is not so limited. These signals are transmitted in a known manner with known equipment to the surface instrumentation via cable 18 after undergoing various degrees of signal processing and conditioning dependent upon the telemetry equipment provided in the tool string and at the surface.

The second tool 14 in the tool string 10 is a tool of the type that produces an indication of porosity that is less affected by the neutron transport properties of the formation than neutron porosity tool 12. Ideally, this porosity tool is responsive to the pore space in the formation matrix but not to the matrix itself. Tool 14 may consist of either a second type of neutron tool that has a different sensitivity to porosity (or to the neutron transport properties of the fluid in the formation porosity) than the tool 12, such as a sidewall epithermal neutron tool (for example, U.S. Pat. No. 3,823,319), or it may consist of a completely different type of tool such as a gamma-gamma porosity tool (such as U.S. Pat. No. 4,048,495) which is responsive to gamma-ray flux, or a sonic tool (U.S. Pat. No. 3,231,041), either of which produce an indication of porosity that is independent of the neutron transport properties of the formation. Each of these tools are known in the art of hydrocarbon well logging so that a detailed description will be omitted for the sake of conciseness.

In the event that first tool 12 and second tool 14 are both neutron tools, the first tool 12 may consist of a neutron tool of the type previously described which operates with a source whose average energy is in the order of 600 keV. while the second neutron tool may consist of an epithermal tool whose average energy is on the order of 4.5 MeV.

The signals from the detectors 34 and 36, as well as the signals generated by the second type of porosity tool 14, after having been transmitted to and received by the surface processing circuitry 28, are converted according to the principles of the present invention into tangible representations of porosity in the form of a log or trace over a depth range. Conversions of the raw data into indications of porosity are made in the functional elements 38 and 40: each of which may be function formers of the appropriate type for the data treated. For example, neutron porosity function former 38 may consist of circuitry for taking the ratio of the near and far detector count rates and then converting the ratio into porosity according to a response curve of a known shape which characterizes the neutron porosity tool 12 of the tool string. Similarly, function former 40, in response to the raw data derived from the other porosity logging tool 14, converts the data into indications of porosity according to techniques well known to be suitable for the particular logging tool 14 in use.

Having determined indications of porosity from each of the tools 12 and 14, the present invention proposes that the porosity indications be compared in order to distinguish between oil and water filling the formation porosity. As has been previously mentioned, it has been discovered that the neutron porosity tool responds differently to some oils in the formation when compared to the manner in which it responds to water in the formation. It is believed that this effect is attributable to the different neutron transport characteristics of those oils as opposed to the neutron transport characteristics of water. As previously discussed, the neutron transport characteristic of both oil and water is primarily determined by the hydrogen density of the fluid. However, it is also recognized that the presence of carbon and the lack of oxygen in oil, and the presence of oxygen and the lack of carbon in water also has an effect.

Figure 2:
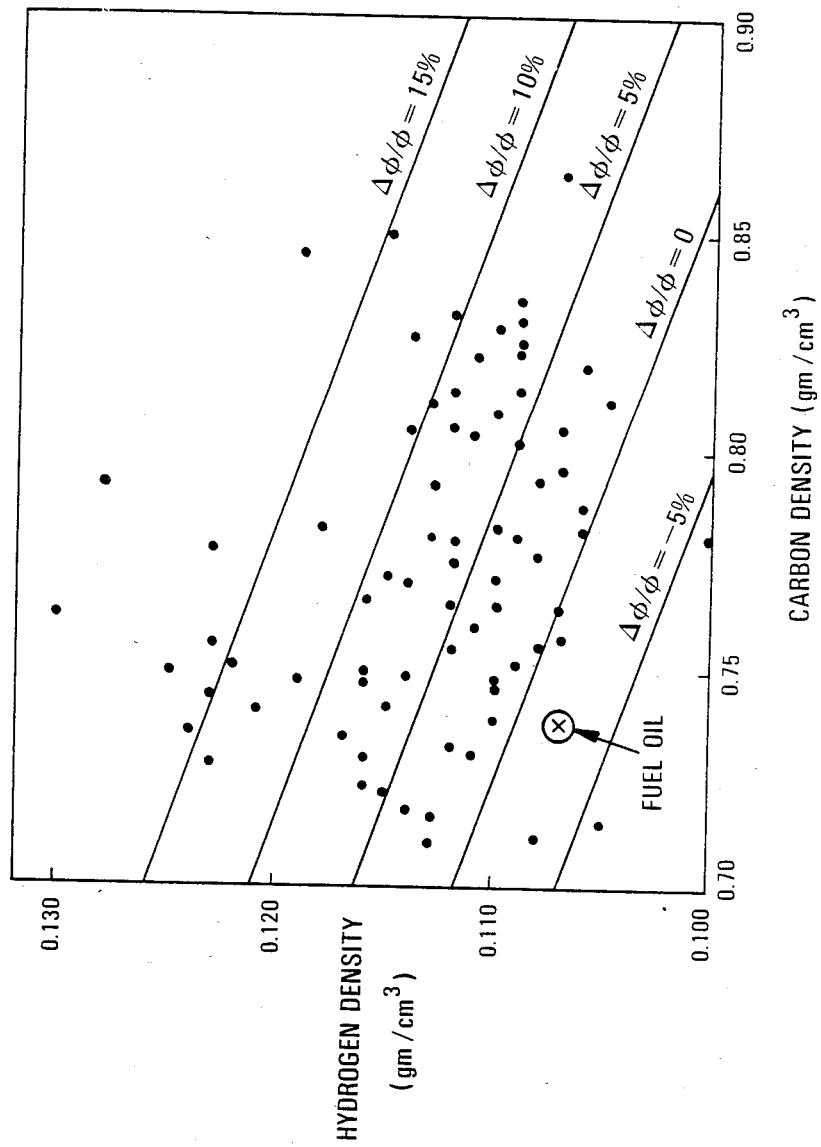
FIG. 2 is a plot of hydrogen density versus carbon density for a sampling of world crude oils.

FIG. 2 is an illustration graphically showing the hydrogen and carbon densities for a number of world crude oils. Overlying this plot are a plurality of curves which show the percent change in porosity due to the combined influences of the hydrogen density and the carbon density of the oil determined by the neutron tool with the oil in the formation relative to the "true" porosity of the formation. It will be recognized that the "true" porosity is that porosity that the second porosity tool 14 would measure and that the neutron tool 12 would measure if the porosity of the formation contained water. As can be seen, the #2 fuel oil point falls relatively close to the line indicating no change in porosity relative to the "true" porosity. In fact, the fuel oil point is so close as to be indistinguishable from neutron tool measurement errors. Thus it can be seen that previous experimental arrangements that have been run with #2 fuel oil in the formation, were unlikely to detect the effect which forms the basis for the present invention. Nevertheless, it can also be seen that there are a large number of world crude oils that produce an apparent change in porosity that is significantly larger than tool measurement error and therefore should produce a detectable effect.

Figure 3:
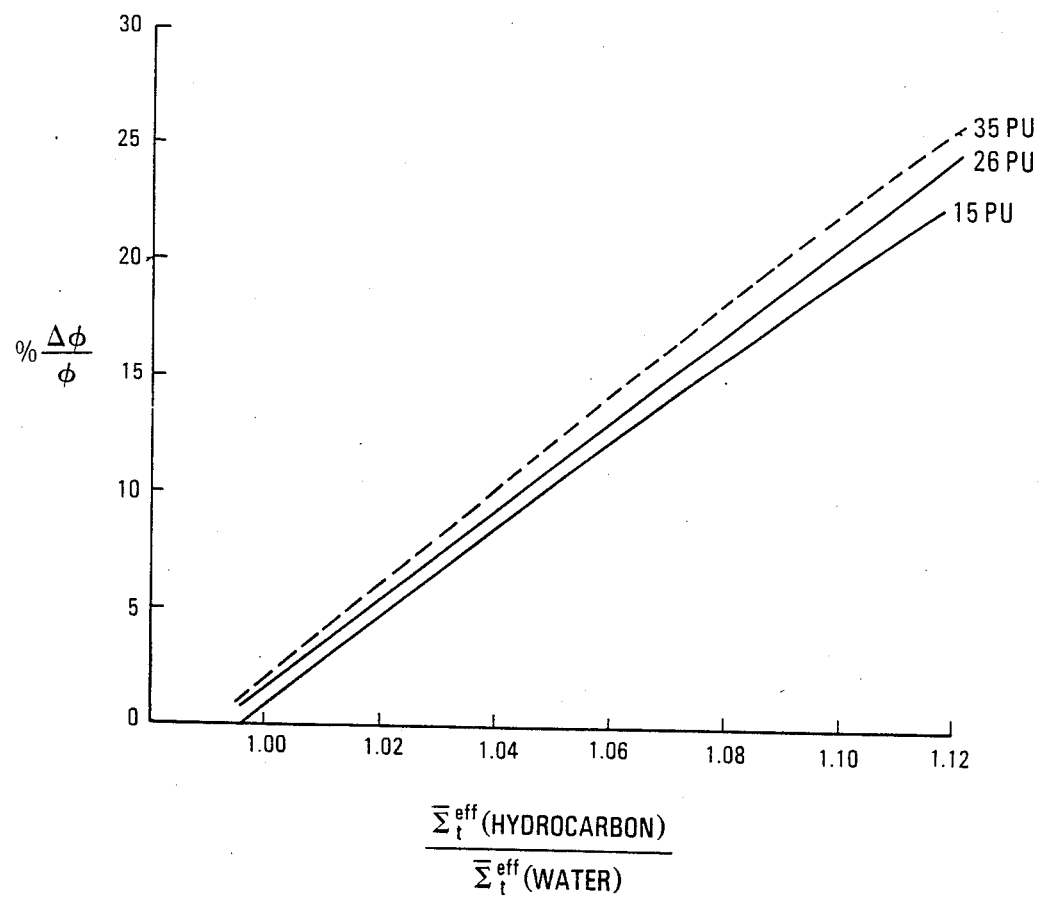
FIG. 3 is a graph showing the apparent change in porosity in percent as a function of an effective total cross section index for hydrocarbons.

In order to further quantify the effect of the influence of the hydrogen and carbon densities on neutron transport, FIG. 3 is a graph showing the apparent change in porosity as a function of an effective total cross section index for hydrocarbons. The effective total cross section index for hydrocarbons is defined as the total effective cross section of hydrocarbon (averaged over source neutron energies) divided by the total effective cross section of water. The three curves drawn for formations having porosities of 15, 26 and 35 porosity units, illustrate that the relative change in porosity is practically independent of the volumetric porosity, that a hydrocarbon with a total effective cross section which is similar to that of water will be indistinguishable from water and that the possibility of distinguishing oil from water increases linearly with the total effective cross section of the hydrocarbon.

It is thought that these results are explained by the fact that the neutron tool's response is related to the distribution of first collisions of high energy source neutrons. This so-called "transported source strength" is in turn governed mainly by the total cross sections of the medium at source neutron energies. Basically then, porosity variations are equivalent on a one-to-one basis to variations in the total effective cross sections which in turn affect the strength of the high energy neutron source especially at the far detector. At a given volumetric porosity, the substitution of oil for water can also alter the total cross section which then manifests itself with the neutron tool as a different apparent porosity response. Hence, a larger apparent porosity is observed when oil is present in the porosity of the formation than when water is present.

As a result, one way of practicing the invention would be to compare the signals from the function formers 38 and 40 by means of a subtraction circuit 42 and a comparator circuit 44. Inasmuch as differences of something like two porosity units is not likely to be significant due to measurement uncertainties, comparator circuit 44 may be set to respond only to differences greater than two P.U. Differences greater than two P.U. however, may be recorded by recorder-plotter 26 as indications of oil. Recorder-plotter 26 also records the individual porosity signals derived from function formers 38 and 40. Indeed, the plotting apparatus 26 may be arranged to plot traces of porosity from the neutron porosity tool and from the other porosity tool so that they overlay one another in order to better highlight the presence and magnitude of the differences.

It will be appreciated that if the oil response is related to the difference in total cross sections between oil and water at source neutron energies, then the magnitude of the effect can be enhanced by employing neutrons at energies where the total cross section mis-match between oil and water is greatest. Two possibilities present themselves. Two neutron sources of different energies could be used: one where the cross section mismatch is small and one where it is large. Different apparent porosities derived from the two sources could be an indicator of oil. Source neutron energies could be "tailored" by judicious choice of shielding. As an example, neutrons produced by a deuterium-deuterium (D,D) accelerator neutron generator may be of particular interest since (D,D) accelerator produced neutrons have energies of 2.45 MeV which is just above a minimum in the water cross section due to the oxygen antiresonance. This minimum is not present in an oil saturated formation.

The above description of the present invention has been in the context of logging a subsurface geological formation in order to distinguish between oil and water. This ability may find special value in the area of production logging where it is important to determine the oil-water interface both before, during and after production of the oil from the well. In this application, an initial series of logs would be run in order to identify the location of the oil-water interface prior to oil production. Logs obtained after production may then be compared to the original log to indicate the degree of movement of the oil-water interface as a measure of the rate of oil production, water coneing, etc.

As a further application of the concepts of the present invention, it is possible to use the magnitude of the difference between the true volumetric porosity and the apparent porosity measured by the neutron tool to determine the hydrogen density of the oil in the formation. Furthermore, if the fluid density of the formation fluid is known, then it becomes possible to determine the hydrogen/carbon weight percent of the formation fluid in situ. These quantities may be of tremendous value in the commercial evaluation of the hydrocarbon reservoir and may greatly assist in the decision to case and cement the borehole and produce the well or in the decision of which hydrocarbon bearing zones in a well should be produced and which should be passed over. These functions are accomplished in the functional element 46 entitled hydrogen and carbon density circuitry: more of which will be described below.

Figure 4:
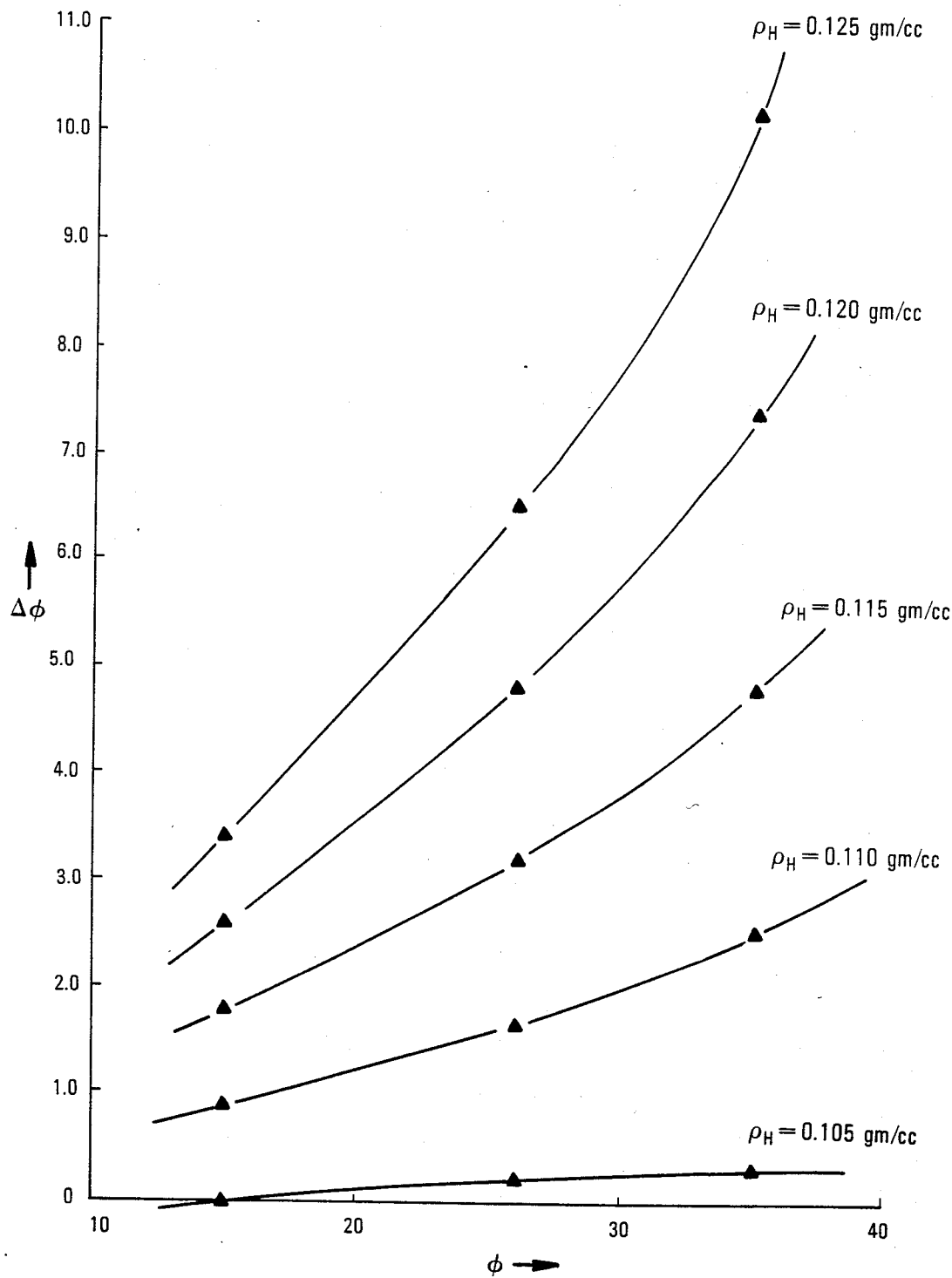
FIG. 4 is a plot illustrating the family of curves of hydrocarbons having constant densities and hydrogen densities as a function of porosity and apparent change in porosity.

FIG. 4 illustrates the family of curves for oils having different hydrogen densities but constant carbon densities plotted on a graph of porosity versus apparent porosity difference as determined from a comparison of the neutron porosity with the value of porosity determined from the other porosity tool 14. With both the apparent change in porosity and porosity as inputs, element 46 determines, by means of a function former, by means of a chart similar to FIG. 4, or by means of a look up table, the corresponding hydrogen density. As can be seen from FIG. 2, hydrogen density of the oil does not uniquely correspond to a single carbon density so that the determination of hydrogen density from FIG. 4 is subject to some uncertainty due to the effect of the carbon density of the oil.

Element 46 may now enter an iterative type of analysis in order to further refine the determination of hydrogen density as well as to provide a determination of carbon density. The further refinement requires, however, further information about the fluid density ($\rho_b$) of the formation fluid and the density of the matrix of the rock of the formation. Such further information may be provided by the owner of the oilwell or fluid density may be calculated from formation bulk density and true porosity log values available from the gamma-gamma density tool ($\rho_b$) and from the sonic porosity tool ($\phi \Delta t$ porosity) respectively by the well known equation $$\rho_b = \rho_{ma}(1-\rho) \pm \rho_f \phi.$$

Having obtained a first estimate of the hydrogen density ($\rho_h$) of the oil, element 46 then may determine a first estimate of the carbon density ($\rho_c$) from the relationship $\rho_f = \rho_h + \rho_c$. With first estimates of both hydrogen density and carbon density, the information contained in the graph of FIG. 2 may then be utilized to determine a first estimate of the difference in porosity that should be expected from the effects of the particular hydrogen density and the carbon density on the porosity response of the neutron tool when compared to true porosity. If the first estimate of the porosity difference determined in this manner differs from the porosity difference calculated by element 42, then a series of perturbations to the hydrogen density may be made and the process repeated iteratively until the estimated porosity difference and the detected porosity difference have been made to agree within the convergence criteria. At this point, element 46 reads out its results to recorder/plotter 26 which also records and/or plots the other items of information in the form of depth varying traces of neutron porosity ($\phi_n$), true porosity ($\phi$), porosity difference ($\Delta_\phi$), hydrogen density ($\rho_h$), carbon density ($\rho_c$), as well as any other combination of these desired such as hydrogen weight percent or hydrogen density to carbon density ratio.

We claim:

1. A method for investigating the oil/fresh water content of the fluid within a geological formation;

a. irradiating said geological formation with neutrons;

b. detecting the resultant neutron flux distribution and generating therefrom a first signal indicative of formation porosity;

c. deriving from said geological formation a second signal indicative of formation porosity but which is less affected by the nature of the pore fluid whether it be fresh water or liquid hydrocarbon than said first signal; and d. comparing said first and second signals to obtain an indication of the presence of oil versus fresh water in said formation.

2. The method as recited in claim 1, wherein said comparing step includes the step of combining said first and second signals to generate a signal proportional to the differential therebetween, said differential signal signifying the presence of oil versus fresh water in said formation.

3. The method as recited in claim 1, wherein said irradiating step includes irradiating said geological formation with neutrons having an average source energy selected such that the total effective neutron scattering cross section of oil is larger than that of fresh water.

4. A method for distinguishing oil from fresh water in a geological formation traversed by a borehole, characterized by the steps of:

a. irradiating said geological formation with neutrons having a first average source energy selected such that the difference between the total neutron cross section of oil and the total neutron cross section of fresh water has a first value;

b. detecting neutrons resulting from step a. and generating a first signal indicative thereof;

c. irradiating said geological formation with neutrons having a second average source energy different from said first average source energy, said second average source energy being selected such that the difference between the total neutron cross section of oil and the total neutron cross section of fresh water has a second value different from said first value;

d. detecting neutrons resulting from step c. and generating a second signal indicative thereof; and e. comparing the signals of steps b. and d. in order to obtain an indication of the presence of oil or of fresh water.

5. The method as recited in claim 4 wherein each step of detecting neutrons includes the step of detecting a spatial neutron flux distribution.

6. The method as recited in claim 4 wherein one of said steps of detecting neutrons includes the step of detecting a neutron flux amplitude at a single point.

7. The method as recited in claim 6 wherein said irradiating step includes irradiating said geological formation with neutrons having an average source energy selected such that the total effective neutron scattering cross section of oil is larger than that of fresh water.

8. The method as recited in claim 4 wherein said first and second average source energies are selected such that the difference between the total effective neutron scattering cross sections of oil and fresh water is greater for neutrons having said first average source energy than for neutrons having said second average source energy.

9. The method as recited in claim 4, wherein said first average source energy is such that the total neutron scattering cross-section mismatch between oil and fresh water is less than that for said second average source energy.

10. A method for distinguishing oil from fresh water in a geological formation traversed by a borehole, characterized by the steps of:

a. irradiating said geological formation with neutrons;

b. detecting the neutron flux distribution resulting from step a. and generating a first signal indicative of formation porosity therefrom;

c. irradiating said geological formation with gamma rays;

d. detecting the gamma ray flux resulting from step c. and generating a second signal indicative of formation porosity therefrom;

e. comparing the porosity signals of steps b. and d. and f. in response to the comparison of step e. generating and recording a signal whose value is indicative of the presence of oil or of fresh water in the geological formation.

11. The method of distinguishing oil from fresh water as recited in claim 10 wherein said step of detecting the neutron flux distribution includes the step of detecting the epithermal neutron flux distribution.

12. The method as recited in claim 10 wherein said irradiating step includes irradiating said geological formation with neutrons having an average source energy selected such that the total effective neutron scattering cross section of oil is larger than that of fresh water.

13. A method for distinguishing oil from fresh water in a geological formation traversed by a borehole, characterized by the steps of:

a. irradiating said geological formation with neutrons;

b. detecting the neutron flux resulting from step a. and generating a first signal indicative of formation porosity therefrom;

c. transmitting sound waves into said geological formation;

d. detecting sound waves returning from the formation resulting from step c. and generating a signal indicative of formation porosity therefrom;

e. comparing the porosity signals of steps b. and d. and f. in response to the comparison step of step e, generating and recording a signal whose value is indicative of the presence of oil or of fresh water in the geological formation.

14. The method as recited in claim 13 wherein said irradiating step includes irradiating said geological formation with neutrons having an average source energy selected such that the total effective neutron scattering cross section of oil is larger than that of fresh water.

15. A system for distinguishing oil from fresh water in a geological formation traversed by a borehole, characterized by:

a. a neutron source for irradiating said geological formation with neutrons;

b. a detector system for detecting the resultant neutron flux distribution and generating therefrom a first signal indicative of formation porosity;

c. an investigatory system for deriving from said geological formation a second signal indicative of formation porosity but which is less affected by the nature of the pore fluid whether it be fresh water or liquid hydrocarbon than said first signal; and d. means for comparing said first and second signals to obtain an indication of the presence of oil versus fresh water in said formation.

16. The system as recited in claim 15, wherein said means for comparing includes means for combining said first and second signals to generate a signal proportional to the differential therebetween, said differential signal signifying the presence of oil versus fresh water in said formation.

17. The apparatus as recited in claim 15, wherein said neutron source is adapted to irradiate said geological formation with neutrons having an average source energy selected such that the total effective neutron scattering cross section of oil is larger that that of fresh water.

18. A system for distinguishing oil from fresh water in a geological formation traversed by a borehole, characterized by:
   a. a first neutron source for irradiating said geological formation with neutrons having a first average source energy selected such that the difference between the total neutron cross section of oil and the total neutron cross section of fresh water has a first value;
   b. a first detector system for detecting neutrons resulting from the irradiation of the formation by said neutrons having a first average source energy and for generating a first signal indicative thereof;
   c. a second neutron source for irradiating said geological formation with neutrons having a second average source energy different from said first average source energy, said second average source energy being selected such that the difference between the total neutron cross section of oil and the total neutron cross section of fresh water has a second value different from said first value;
   d. a second detector system for detecting neutrons resulting from the irradiation of the formation and for generating a second signal indicative thereof; and
   e. means for comparing said first and second signals in order to obtain an indication of the presence of oil of fresh water.

19. The system as recited in claim 18 wherein each of said detector systems includes means for detecting a spatial neutron flux distribution.

20. The system as recited in claim 18 wherein one of said detector systems for detecting neutrons includes means for detecting a neutron flux amplitude at a single point.

21. The system as recited in claim 18 wherein said first and second average source energies are selected such that the difference between the total effective neutron scattering cross sections of oil and fresh water is greater for neutrons having said first average source energy than for neutrons having said second average source energy.

22. The system as recited in claim 18, wherein said first average source energy is such that the total neutron scattering cross-section mismatch between oil and fresh water is less than that for said second average source energy.

23. A system for distinguishing oil from fresh water in a geological formation traversed by a borehole, characterized by:
   a. a neutron source for irradiating said geological formation with neutrons;
   b. a first detector system for detecting the neutron flux distribution resulting from the irradiation of said geological formation and for generating a first signal indicative of formation porosity therefrom;
   c. a source for irradiating said geological formation with gamma rays;
   d. a second detector system for detecting the gamma ray flux resulting from the gamma ray irradiation of said geological formation and for generating a second signal indicative of formation porosity therefrom;
   e. means for comparing said first and second porosity signals derived from said first and second detecting systems; and
   f. means responsive to the comparison means of e. for generating and recording a signal whose value is indicative of the presence of oil or of fresh water in the geological formation.

24. The system for distinguishing oil from fresh water as recited in claim 23 wherein said first detector system includes a detector for detecting the epithermal neutron flux distribution.

25. The apparatus as recited in claim 23, wherein said neutron source is adapted to irradiate said geological formation with neutrons having an average source energy selected such that the total effective neutron scattering cross section of oil is larger than that of fresh water.

26. A system for distinguishing oil from fresh water in a geological formation traversed by a borehole, characterized by:
   a. a neutron source for irradiating said geological formation with neutrons;
   b. a detector system for detecting the neutron flux resulting from the irradiation of the formation and for generating a first signal indicative of formation porosity therefrom;
   c. an acoustic energy generating system for transmitting acoustic energy into said geological formation;
   d. an acoustic receiving system for detecting sound waves returning from the formation and for generating a second signal indicative of formation porosity therefrom;
   e. means for comparing said first and second porosity signals; and
   f. means responsive to said comparison means for generating and recording a signal whose value is indicative of the presence of oil or of fresh water in the geological formation.

27. The apparatus as recited in claim 26, wherein said neutron source is adapted to irradiate said geological formation with neutrons having an average source energy selected such that the total effective neutron scattering cross section of oil is larger than that of fresh water.

28. A method for monitoring a geological formation to detect the displacement of a first liquid having a first hydrogen density by a second liquid having a second hydrogen density comprising the steps of:
   a. irradiating said formation with neutrons and generating a first signal indicative of the resultant neutron flux prior to the displacement of said first liquid;
   b. irradiating said formation with neutrons and generating a second signal indicative of the resultant neutron flux subsequent to the displacement of said first liquid;
   c. converting each of said first and second signals into respective first and second signals indicative of porosity;
   d. comparing said first and second porosity indicative signals to derive a signal whose value is indicative of the displacement of said first liquid by said second liquid; and e. in response to said comparing step recording said signal whose value is indicative of the displacement of said first liquid by said second liquid.

29. The method as recited in claim 28 wherein said step of irradiating said formation with neutrons includes irradiating said formation with a neutron flux whose average neutron energy has been selected such that the total effective neutron scattering cross section of said first liquid is larger than that of said second liquid.

30. The method as recited in claim 29 wherein said first liquid is oil and said second liquid is fresh water.

* * * * *